Figure 1:
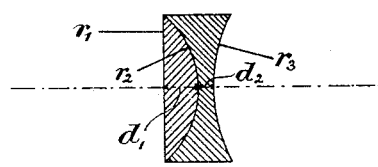

(No Model.)

P. RUDOLPH.
ACHROMATIC DISPERSING LENS FOR LENS SYSTEMS, &c.

No. 538,182. Patented Apr. 23, 1895.

= Flint.   = Crown.

Witnesses:

Inventor:
Paul Rudolph
by Marcellus Bailey
his attorney.

UNITED STATES PATENT OFFICE.

PAUL RUDOLPH, OF JENA, GERMANY, ASSIGNOR TO THE FIRM OF CARL ZEISS, OF SAME PLACE.

ACHROMATIC DISPERSING-LENS FOR LENS SYSTEMS, &c.

SPECIFICATION forming part of Letters Patent No. 538,182, dated April 23, 1895.

Application filed June 14, 1893. Serial No. 477,594. (No model.)

*To all whom it may concern:*

Be it known that I, PAUL RUDOLPH, doctor of philosophy, a subject of the Duke of Saxe-Altenberg, residing at Jena, in the Grand Duchy of Saxe-Weimar, German Empire, have invented a new and useful Achromatic Dispersing-Lens for Lens Systems consisting of two parts, of which the following is a specification.

In optical systems, which—as for instance the Galilean telescope, and the so-called tele-objective, which of late is used for photographic purposes—besides the achromatic objective, also contain, distinct from the latter, an achromatic dispersing lens of a shorter focal distance than the objective. This dispersing lens has so far always been achromatized in the same way as an objective consisting of single lenses cemented to each other is to be achromatized in order to correct the spherical aberration at the same time with the dispersion of colors. In analogy thereto the main lens, (which in this case is negative,) of dispersing lenses of this kind, has been made of crown-glass of low refractive power, and the correcting lens to be cemented to it, (which in this case is positive,) has been made of flint-glass of considerably greater refractive power. This graduation of the refractive power is actually as necessary and indispensable in a dispersing lens, as it is in a collecting lens, if such a dispersing lens is to be not only chromatically but also spherically corrected, and if it is to consist at the same time of single lenses cemented to each other; for it is only through the surplus of refractive power of the positive constituent over that of the negative constituent that the inner surfaces of a dispersing lens obtain a spherical aberration contrary and compensatory to that of the outer surfaces.

In combinations of lenses of the category described it is not advisable however—as I have been taught by theoretical and practical experience—, for obtaining a good total effect of the combination, to correct the dispersing lens by itself with regard to spherical aberration as has been done so far intentionally or without intention.

If, as is the case with the above combinations of lenses, the focal distance of the dispersing lens is considerably smaller than that of the objective belonging to it, and if the distance of the dispersing lens from the objective is at least equal to its focal distance, any spherical aberration of it can always easily be made innocuous to the total effect by an intentionally not corrected, relatively small rest of spherical aberration on the part of the objective. In the usual kind of correction of those systems the surplus of the refractive power of the positive element of the dispersing lens requires in any case an unfavorable increase of the degree of curvature of its outer surfaces necessary for a determinated focal distance. Besides, this surplus causes at the cemented inner surfaces of the lens, which have a comparatively great degree of curvature, effects of aberration which prevent the total effect of the combination especially outside the axis to be accessible to a more minute regulation. This experience has induced us to effect the achromatization of such optical systems according to a process contrary to the previous method, namely so, that no compensation or great reduction of the spherical aberration is connected with the achromatization of the dispersing lens, but that this lens—without detriment to the perfect achromatization—retains, as regards spherical aberration, the character of a simple uncorrected dispersing lens. This object is attained by forming the positive part of the cemented system of flint-glass of which the refractive power is only little greater or equal or smaller than the refractive power of the negative part, but of which the relative dispersion $\left(\frac{\Delta n}{n-1}\right)$ still possesses a sufficient surplus over that of the negative part in order to enable the achromatization with favorable degrees of curvature of the two parts.

The advantages in using achromatic dispersing lenses of this new kind of composition in the optical combinations mentioned at the beginning, are principally, first, that for any focal distance required a considerably smaller degree of curvature of the outer lens-surfaces is obtained than is required by the usual composition, and that this degree of curvature may even be reduced at convenience; second, that the positive spherical aberration (viz., the sense of which is the same as that of a single convex lens), which takes place at the inner cemented surfaces of the lens, can be reduced at convenience, or conducted over into a negative spherical aberration (viz., the sense of which is the same as that of a single dispersing lens).

The first named advantage is seen from the following comparison: In all achromatic dispersing lenses used till now, the refractive index $n^D$ of the crown-glass lies between 1.51 and 1.52. The refractive index of the flint-glass $n'^D$ lies between 1.60 and 1.63. The surplus $(n'-n)$ in the refractive index of the positive element over that of the negative element is therefore between 0.08 and 0.12. Under these circumstances complete achromatization—if the most favorable kinds of glass, as regards dispersion of colors, are selected—requires a total degree of curvature K of the outer surfaces of the lens (K=algebraic difference of the reciprocal radii of curvature of both surfaces) at least equal to 2.4 times the reciprocal focal distance $\left(\dfrac{1}{f}\right)$ of the lens, viz: $K=2.4\times\dfrac{1}{f}$; but if the difference $n'-n$ is reduced to the smaller amount of say 0.03, retaining however as great a difference as possible of the relative dispersion of the two parts (from which follows indirectly that the cemented lens, in the practically applicable forms, retains a spherical aberration of the kind of a concave lens), complete achromatism can be obtained with the following kinds of glass:

Crown ....... $n^D=1.574$; $n^F=n^C=0.01005$
Flint......... $n'^D=1.603$; $n'^F=n'^C=0.01576$ with a degree of curvature of the outer surfaces $K=1.9\times\dfrac{1}{f}$. If $n'-n=D$ is taken, the required degree of curvature is reduced to: $K=1.67\times\dfrac{1}{f}$. Again if $n'<n$ o is taken,—(for which the kinds of glass at disposal leave ample space, without the complete achromatization of the lenses being affected)—the proportion of $K:\dfrac{1}{f}$ may even be reduced as may be required so that the outside form of the dispersing lens may be brought near to the plano-plate or to the watch-glass, without the radii of curvature of the inner surfaces—if a triple cemented lens is admissible—becoming too small in comparison to the focal distance. The following kinds of glass:

Crown ...... $n^D=1.6112$  $n^F-n^C=0.01068$
Flint ....... $n'^D=1.5366$  $n'^F-n'^C=0.01102$ give for instance $K=0.34\times\dfrac{1}{f}$, while the radius of the inner cemented surfaces of a symmetrical triple lens of these kinds of glass, with the flint-glass situated inside, is $r=0.094\,f$.

As regards the second advantage stated, the reduction of the spherical aberration at the inner cemented surfaces of such dispersing lenses, or the conversion of the character of this aberration, it is evident, that in the same degree as the indices of refraction $n'$ and $n$ approach conformity, the effect of refraction of the inner cemented surface or surfaces, and in connection therewith the spherical aberration ceases more and more, that is to say high degrees of curvature of these surfaces can be selected without causing irregularities of the correction. If $n'=n$ is taken, the cemented achromatic dispersing lens, not speaking of the achromatism, acts as a simple dispersing-lens. Of special practical importance however is the possibility of choosing, in dispersing-lenses of the kind in question, the refractive index of the positive element (flint-glass), smaller than the refractive index of the negative element (crown-glass), and obtaining through this, besides the above said great reduction of the degree of the outer curvature, a conversion of the character of the spherical aberration of the inner surfaces, in comparison to the constructions used till now for achromatic dispersing lenses. This conversion offers valuable assistance in the lens-combinations coming into consideration (Galilean telescopes, tele-objectives, &c.), for bringing about correcting effects outside the axis through the dispersing lens, which cannot be obtained with the ordinary composition of the latter.

According to the special requirements as to their effect, the new dispersing lens will be cemented together out of two or three single lenses for which two or if advisable three various kinds of glass are used, and it will be constructed symmetrical or unsymmetrical.

The single elements of construction must (if the maximum effect is required)—of course be determined with regard to the construction of the objective with which they are to be combined, especially with regard to its aperture and its spherical correction within and without the axis. The description of the following types of lenses suitable for co-operation with different constructions of objectives and for various purposes of application, the sections of which are shown by Figures 1 to 6 of the drawings, may serve as an example.

Figure 2:
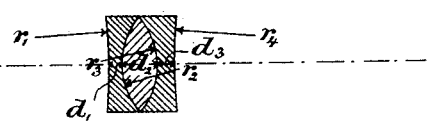
Figure 3:
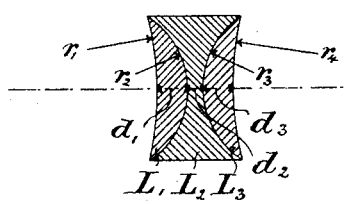
Figure 4:
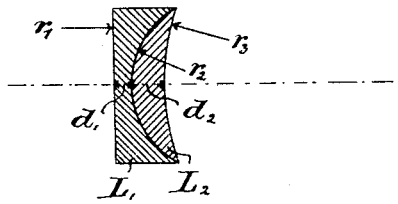
Figure 5:
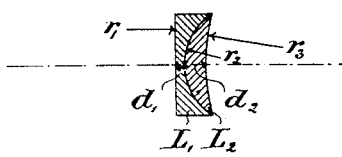
Figure 6:
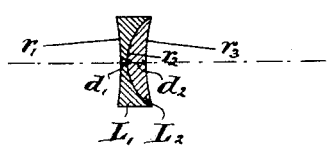

Fig. 1 represents an axial section through a double dispersing lens constructed according to this invention. Fig. 2 represents a like section through a triple dispersing lens. Fig. 3 represents a like section through another triple dispersing lens. Figs. 4 to 6 represent like sections through double dispersing lenses.

The plano-concave compound lens of Fig. 1 consists of a plano-convex lens L, of flint glass and a bi-concave lens L² of crown glass.

The bi-concave compound lens of Fig. 2 consists of two bi-concave lenses L, and L³ of crown glass and a bi-convex lens L² of flint glass included by them.

The bi-concave compound lens of Fig. 3 consists of two concavo-convex lenses L', and L³ of flint glass and a bi-concave lens L² of crown glass included by them.

The plano-concave compound lenses of Figs. 4 and 5 consist each of a plano-concave lens L', of crown glass and a concavo-convex lens L² of flint glass.

The bi-concave compound lens of Fig. 6 consists of a bi-concave lens L', of crown glass, and a concavo-convex lens L² of flint glass.

These six compound lenses are constructed according to the following formula of dimensions, in which for convenience the factor "focal distance of the objective lens" has been omitted. The values given for the focal distance of the dispersing lens refer to a focal distance of the objective lens equal to + 1.

The signs agree with those in the figures, and the kinds of glass are determined by the indices of refraction $n^D$, $n^C$ and $n^F$ for the Fraunhofer lines D, C and F.

First. Unsymmetrical double achromatic dispersing lens for Galilean telescopes with achromatic objectives of ordinary construction, represented by Fig. 1 for the focal distance of fifty millimeters. Indications for the focal distance of —1.0:

| Radii. | Thickness of lenses. | Diameter of lenses. |
|---|---|---|
| $r'=\infty$ | $d'=0.151$ | 0.54 |
| $r^2=-0.3303$ | $d^2=0.063$ | |
| $r^3=+0.6126$ | | |

Kinds of glass employed:

| | $n^D$. | $n^C$. | $n^F$. |
|---|---|---|---|
| Flint | L'=1.61201 | 1.60729 | 1.62383 |
| Crown | L²=1.61230 | 1.60912 | 1.61990 |

Degree of the outer curvature:

$$K=1.63\times\frac{1}{f}.$$

Second. Symmetrical triple achromatic dispersing-lenses for Galilean telescopes with objectives of relatively large aperture. Indications for the focal distance of —1.0:

(a) Flint-glass between two crown-glasses, represented by Fig. 2 for the focal distance of fifty millimeters:

| Radii. | Thickness of lenses. | Diameter of lenses. |
|---|---|---|
| $r'=-1.8753$ | $d'=d^3=0.055$ | 0.36 |
| $r^2=+0.2816$ | $d^2=0.137$ | |
| $r^3=-0.2816$ | | |
| $r^4=+1.8753$ | | |

Kinds of glass:

| | $n^D$. | $n^C$. | $n^F$. |
|---|---|---|---|
| Crown | L'=L³ 1.57276 | 1.57017 | 1.57891 |
| Flint | L²= 1.52294 | 1.51994 | 1.53022 |

Degree of the outer curvature: $K=1.17\times\frac{1}{f}.$ (b) Crown-glass between two flint-glasses, represented by Fig. 3 for the focal distance of fifty millimeters:

| Radii. | Thickness of lenses. | Diameter of lenses. |
|---|---|---|
| $r'=-1.0247$ | $d'=d^3=0.117$ | 0.53 |
| $r^2=-0.3233$ | $d^2=0.052$ | |
| $r^3=+0.3233$ | | |
| $r^4=+1.0247$ | | |

Kinds of glass:

| | $n^D$. | $n^C$. | $n^F$. |
|---|---|---|---|
| Flint | L'=L³=1.53486 | 1.53169 | 1.54257 |
| Crown | L²= 1.52094 | 1.51871 | 1.52617 |

Degree of the outer curvature: $K=2.0\times\frac{1}{f}.$

Third. Double negative lenses of various focal distances for a photographic combination with any photographic objective, but especially adapted to an achromatic objective of three cemented lenses of which the elements of construction are for the focal distance of 1.0. Not shown.

| Radii. | Thickness of lenses. | Diameter of lenses. |
|---|---|---|
| $r'=+0.5474$ | $d'=d^3=0.016$ | 0.26 |
| $r^2=+0.2573$ | $d^2=0.055$ | |
| $r^3=-0.5474$ | | |
| $r^4=-1.9433$ | | |

Kinds of glass:

| | $n^D$. | $n^C$. | $n^F$. |
|---|---|---|---|
| Flint | L'=L³=1.57740 | 1.57338 | 1.58734 |
| Crown | L²= 1.51708 | 1.51456 | 1.52305 |

Elements of construction for the accessory negative lenses:

(a) Dispersing lens of a focal distance=$-\frac{1}{2}$, represented in Fig. 4 for the focal distance of seventy-five millimeters:

| Radii. | Thickness of lenses. | Diameter of lenses. |
|---|---|---|
| $r'=\infty$ | $d'=0.022$ | 0.20 |
| $r^2=+0.1128$ | $d^2=0.044$ | |
| $r^3=+0.2655$ | | |

Kinds of glass:

| | $n^D$. | $n^C$. | $n^F$. |
|---|---|---|---|
| Crown | L'=1.57420 | 1.57124 | 1.58129 |
| Flint | L²=1.60310 | 1.59858 | 1.61434 |

Degree of the outer curvature: $K=1.9\times\frac{1}{f}.$ (b) Dispersing lens of a focal distance=$-\frac{1}{3}$, represented in Fig. 5 for the focal distance of fifty millimeters:

| Radii. | Thickness of lenses. | Diameter of lenses. |
|---|---|---|
| $r'=\infty$ | $d'=0.014$ | 0.13 |
| $r^2=+0.0752$ | $d^2=0.029$ | |
| $r^3=+0.1770$ | | |

Kinds of glass: The same as in (a).

Degree of the outer curvature: $K=1.9\times\frac{1}{f}.$ (c) Dispersing lens of a focal distance=$-\frac{1}{4}$, represented in Fig. 6 for the focal distance of 37.5 millimeters:

| Radii. | Thickness of lenses. | Diameter of lenses. |
|---|---|---|
| $r'=-0.8065$ | $d'=0.011$ | 0.12 |
| $r^2=+0.0699$ | $d^2=0.024$ | |
| $r^3=+0.1851$ | | |

Kinds of glass:

Crown ........ $L'=1.60954$   1.60639   1.61707
Flint ........ $L^2=1.62020$   1.61531   1.63240

Degree of the outer curvature: $K = 1.7 \times \dfrac{1}{f}$.

I claim as my invention—

An achromatic dispersing lens for use with a collecting lens of longer focal distance than the dispersing lens, the positive constituent of the latter having a refractive power of from less than to about equal to the refractive power of the negative constituent.

In testimony whereof I have hereunto set my hand in the presence of two subscribing witnesses.

PAUL RUDOLPH.

Witnesses:
   CARL BORNGRAEBER,
   HEINRICH GUSTAV HOEFLER.